United States Patent [19]

Miller et al.

[11] Patent Number: 5,025,976

[45] **Date of Patent: * Jun. 25, 1991**

[54] MANUFACTURING METHOD FOR A SCULPTURE HAVING SIMULATED HAIR

[76] Inventors: Jack V. Miller; Ruth E. Miller, both of 700 North Auburn Avenue, Sierra Madre, Calif. 91024

[ * ] Notice: The portion of the term of this patent subsequent to Oct. 17, 2006 has been disclaimed.

[21] Appl. No.: 339,998

[22] Filed: Apr. 17, 1989

Related U.S. Application Data

[63] Continuation-in-part of Ser. No. 185,396, Apr. 25, 1988, Pat. No. 4,874,676.

[51] Int. Cl.[5] .............................................. B23K 31/02

[52] U.S. Cl. .................................... 228/165; 228/182; 228/57; 164/138; 264/243; 264/261; 156/61

[58] Field of Search ...................... 164/76.1, 412, 138; 228/165, 175-177, 182, 185, 192, 57; 156/61, 72, 293; 264/243, 261; 446/394; 428/542.2, 39

[56] References Cited

U.S. PATENT DOCUMENTS 1,690,764 11/1928 Altbuch ................................ 156/61
2,636,460 4/1953 Seiderman ........................... 156/72
3,264,160 8/1966 Donofrio ............................... 156/61
3,265,796 8/1966 Rodriguez, Jr. .................... 264/243
3,578,542 5/1971 Migitz ................................. 264/243
4,874,676 10/1989 Miller et al. ........................ 446/394

FOREIGN PATENT DOCUMENTS 1129764 1/1957 France ............................... 264/243
8373 1/1977 Japan .................................... 156/61

*Primary Examiner*—Sam Heinrich

[57] ABSTRACT

A method for manufacturing a sculpture having simulated hair includes forming a rigid body of an animal figure having a plurality of small holes, cutting a plurality of lengths of metallic link chain to the desired length of hair strands for the body, soldering at least some of the chain links together with a metallic matrix having a lower melting temperature than the metal of the chain links, orienting the bonded chain links to style the chain into a preferred hair pattern, finishing the styled hair pattern chain with decorative metal plating or patina, and bonding the styled and plated chain hair pattern into the holes of the animal body.

20 Claims, 5 Drawing Sheets

MANUFACTURING METHOD FOR A SCULPTURE HAVING SIMULATED HAIR

This application is a continuation-in-part application of application Ser. No. 185,396, filed Apr. 25, 1988, now U.S. Pat. No. 4,874,676.

BACKGROUND OF THE INVENTION

This invention relates to fine arts sculpture and the method for manufacturing such sculpture in the form of rigid animal figures having hair. The representation of hair on animal figures, human and non-human, has always been a challenge to artists. Fine hair structures cannot be cast as a part of the sculpture, since the casting materials, such as metals, ceramic slips or organic resins will not flow into very small mold passages. Hence, cast representations of hair end up as a textured heavy mass, stylized to disguise the lack of realism, and usually having the solid, opaque appearance of cake frosting. Such attempts are seen in U.S. Pat. Nos. 259,479; 293,218; 293,220; 293,560 and 293,959. The result of attempts to represent individual hair fibers in hard materials, such as ceramic or metal requires gross enlargement of the cross-sectional size of the hair strands, usually resulting in hair that looks very much like cooked spaghetti.

Chains have been attached to sculptures for many years to represent ropes, cords, sashes, animal harnesses, and the like, but have not had available a realistic method for their use to represent hair on human figures, or manes and tails of other animals.

SUMMARY OF THE INVENTION

A primary purpose of the present invention is to provide an animal sculpture and method for manufacture therefor that has realistic appearing hair, with some trans-illumination visible through strands of material representing hair.

It is a further purpose of the present invention to provide animal sculptures in rigid materials, such as metals, resins and ceramics, and a method for manufacturing them with improved lightness and some degree of movement in the hair representation.

The achievement of the foregoing purposes of the invention is obtained in a piece of sculpture representing an animal having hair, and includes a rigid body and elongated metallic link chain strands made of very fine, small chain links. The chain strands are attached by a first end of each chain strand to the body, leaving the second end hanging free and representing hair. With the use of rolled or diamond-cut chains, the sheen of hair may be clearly represented. Since light may be seen between portions of the links, and between strands, hair is lighter and more realistic. The free ends of the chain strands may move freely in a slight breeze or slight base movement, whereby the realism is enhanced by movement of reflective strands.

A preferred embodiment includes some of the chain links rigidized with solder between adjacent links, which may be in the form of waves, curls or braids. Individual fine strands may be styled together or separately to simulate virtually any configuration for either humans or for non-human animals.

A method for manufacturing a sculpture having simulated hair includes casting or molding a body of an animal figure having a plurality of small holes, cutting one or more lengths of metallic link chain to the desired length of hair strands for the body, soldering at least some of the chain links together with a metallic matrix having a lower melting temperature than the metal of the chain links, orienting the bonded chain links to style the chain into a hair pattern, plating the styled hair pattern chain with decorative metal, and soldering the styled and plated chain hair patterns into the holes of the animal body. The plating of the chain may also be a patina conversion coating optionally made to match or contrast with the background color of the figure, and the solder used to bond the strands into the body may have a patina applied to match the color of the cast body.

DETAILED DESCRIPTION OF THE DRAWINGS

Figure 1:
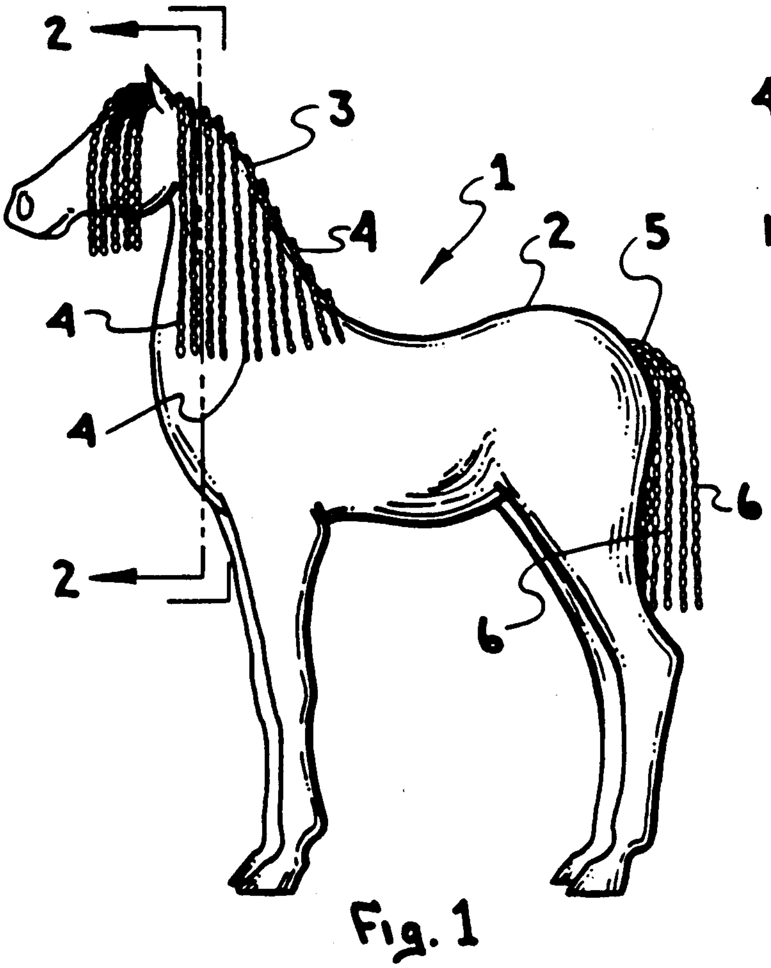
FIG. 1 is a side elevation view of a quadruped animal sculpture with a mane and tail, according to the invention.

In FIG. 1 an animal sculpture 1 is shown having a rigid body 2 supporting a mane 3 constructed of a plurality of strands 4 of metallic link chain, and a tail 5 constructed of a plurality of strands 6 of metallic link chain.

Figure 2:
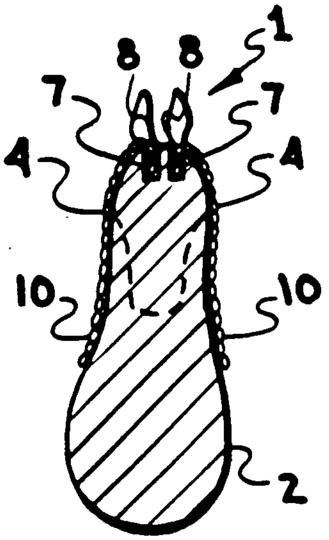
FIG. 2 is a cross-sectional view of the sculpture of FIG. 1, taken along line 2—2.

In FIG. 2 the cross-sectional view of the sculpture 1 of FIG. 1 is shown with the body 2 having a plurality of holes 7 produced by a plurality of pins protruding into a closed cavity in which the body 2 is cast, and into which chain strands 4 installed using a bonding adhesive 8. Bonding adhesive 8 is selected to be compatible with the material of the body 2; wherein of the body 2 is cast of a solderable material, such as brass, bronze, or silver, then metallic solder would be selected as the bonding adhesive. If body 2 is cast of a non-solderable material such as wood, stone, or polyester resin; then an organic adhesive, such as epoxy resin is selected to bond the chain strands into the holes.

Figure 3:
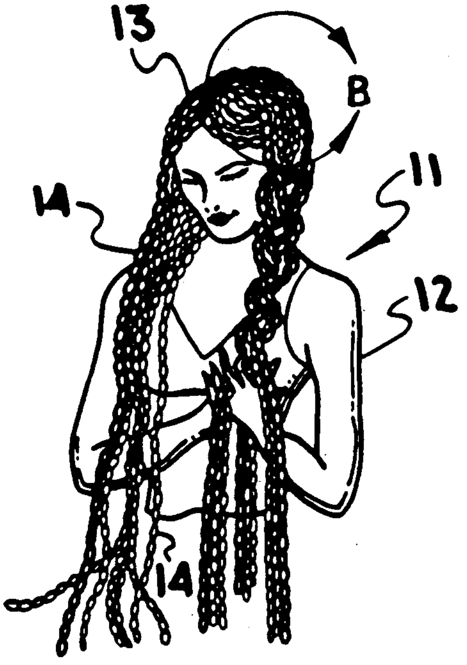
FIG. 3 is a front quarter elevation view of a human figure sculpture according to the invention.

In FIG. 3 a front quarter view of a human figure sculpture 11 is shown according to the invention and including a rigid body 12 having hair 13 constructed of a plurality of strands 14 of metallic link chain.

Figure 4:
FIG. 4 is a rear quarter elevation view of a human figure sculpture according to the invention.

In FIG. 4 a rear quarter elevation view of the human figure sculpture 11A of FIG. 3 is shown having a rigid body 12A having hair 13 constructed of a plurality of strands 14 of metallic link chain.

Figure 5:
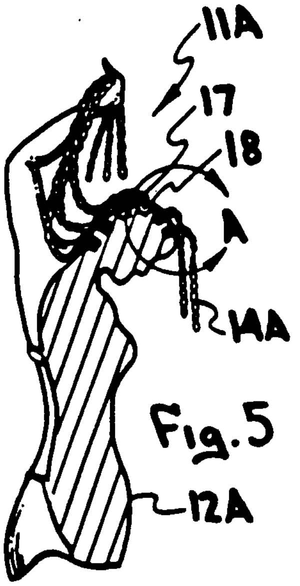
FIG. 5 is a cross-sectional view of the sculpture of FIG. 4, taken along line 4—4.

In FIG. 5 a cross-sectional view of the sculpture of FIG. 4 shows the rigid body 12A having a plurality of holes 17 into which chain strands 14A are installed using a bonding adhesive 18. Bonding adhesive 18 is selected to be compatible with the material of rigid body 12A, wherein of the body 12A is cast of a solderable metallic material, such as brass, bronze or silver, then welding or metallic solder would be selected as the bonding adhesive. If body 12A is made of a non-solderable material such as aluminum, stone, wood, or polyester resin, then an organic adhesive such as epoxy resin is selected to bond the chain strands into the holes.

Figure 6:
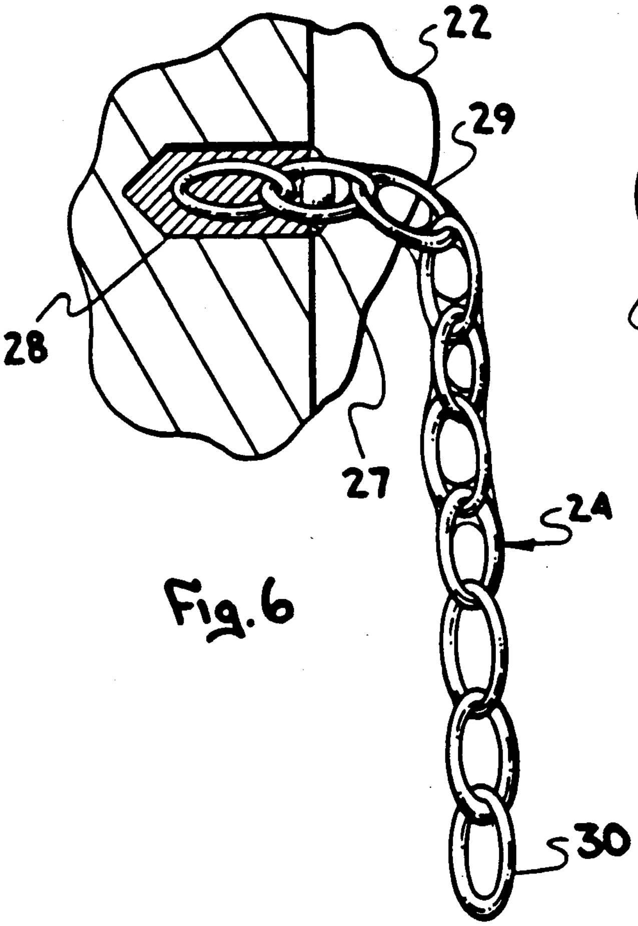
FIG. 6 is an enlarged perspective view of detail A of FIG. 5 in a preferred embodiment structure which shows substantially straight hair represented by oval-link chain.

In FIG. 6 an enlarged and simplified perspective view of a single strand configuration according to the invention is shown in which the body 22 is provided with at least one hole 27 into which at least one strand 24 is bonded using an adhesive 28. Chain strand 24 is shown as substantially straight hair represented by oval-link chain, and having an at least partially rigidized first end 29 with adjacent links soldered together, and a substantially flexible second end 30 having adjacent chain links free to move.

Figure 7:
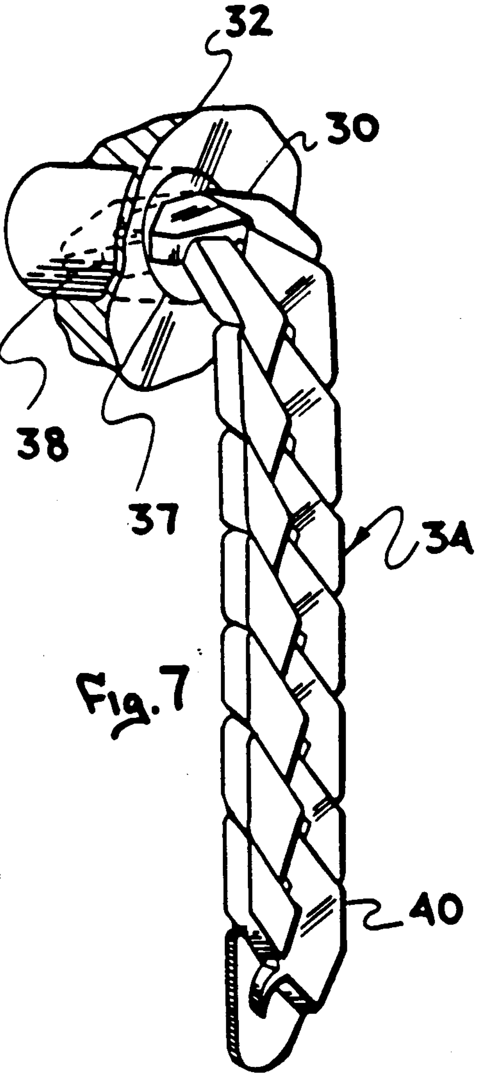
FIG. 7 is an enlarged partial perspective view of detail A of FIG. 5 in an alternate preferred embodiment showing hair represented by rolled-link chain.

In FIG. 7 an enlarged and simplified perspective view of an alternate preferred embodiment for a single strand according to the invention is shown in which the body 32 is provided with at least one hole 37 into which at least one strand 34 is bonded using an adhesive 38. Chain strand 24 is shown as substantially straight hair represented by flat-rolled metal link chain, and having an at least partially rigidized first end 39 with adjacent links soldered together, and a second end 40 which may have adjacent chain links free to move. The flat-rolled chain is sometimes called "diamond-cut" as it is shaved with a diamond tool after rolling to provide a specular reflective surface on the flat sides of the chain. Use of this type of chain enhances the reflectivity of the simulated hair on the figure.

Figure 8:
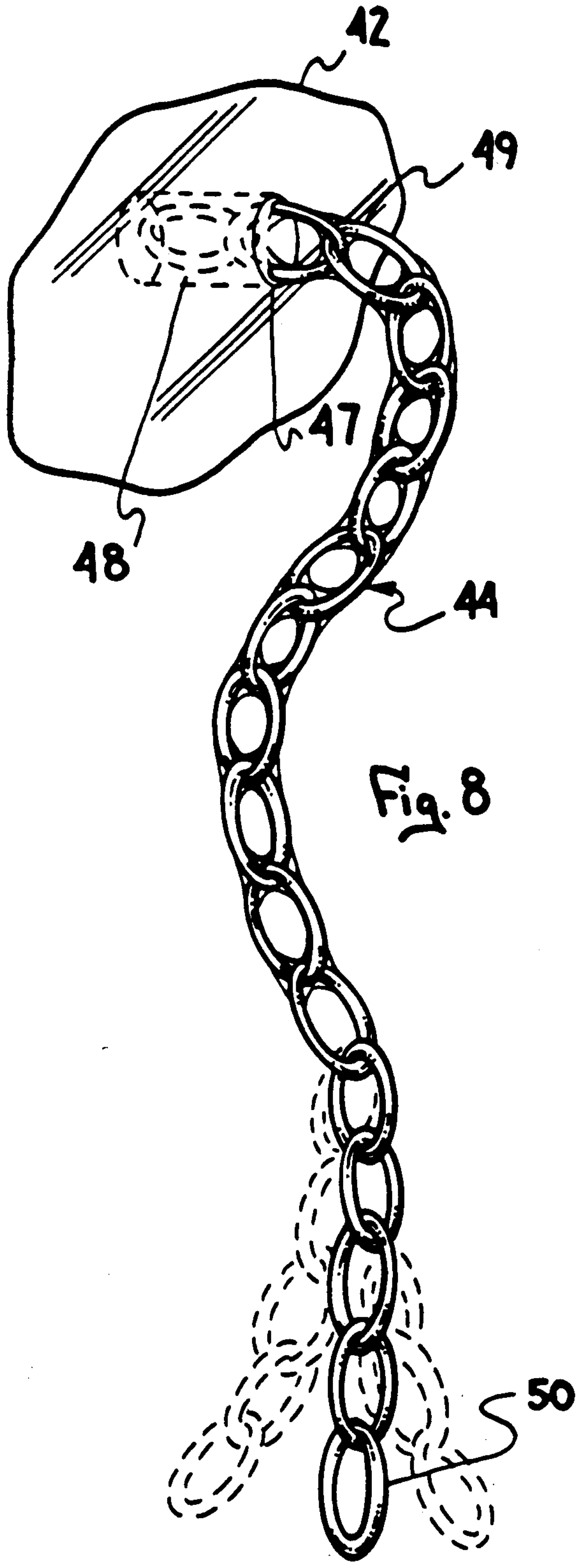
FIG. 8 is an enlarged perspective view of a preferred embodiment for a single strand of hair according to the invention, which provides wavy hair.

In FIG. 8 an enlarged and simplified perspective view of a single strand configuration according to the invention is shown in which the body 42 is provided with at least one hole 47 into which at least one strand 44 is bonded using an adhesive 48. Chain strand 44 is shown as substantially wavy hair represented by oval-link chain, and having an at least partially rigidized first end 49 with adjacent links soldered together, and a second end 50 which may have adjacent chain links free to move.

Figure 9:
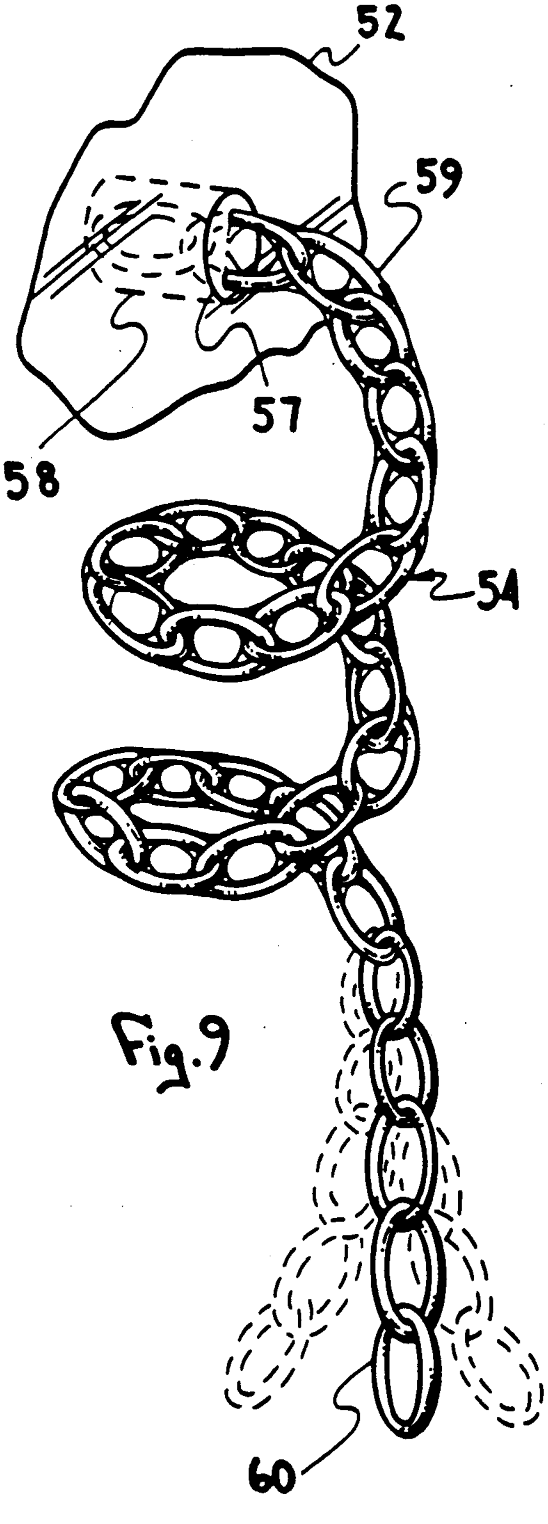
FIG. 9 is an enlarged perspective view of another preferred embodiment for a single strand of hair according to the invention which shows curly hair.

In FIG. 9 an enlarged and simplified perspective view of a single strand configuration according to the invention is shown in which the body 52 is provided with at least one hole 57 into which at least one strand 54 is bonded using an adhesive 58. Chain strand 54 is shown as substantially curly hair represented by oval-link chain, and having an at least partially rigidized first end 59 with adjacent links soldered together, and a second end 60 which may have adjacent chain links free to move.

Figure 10:
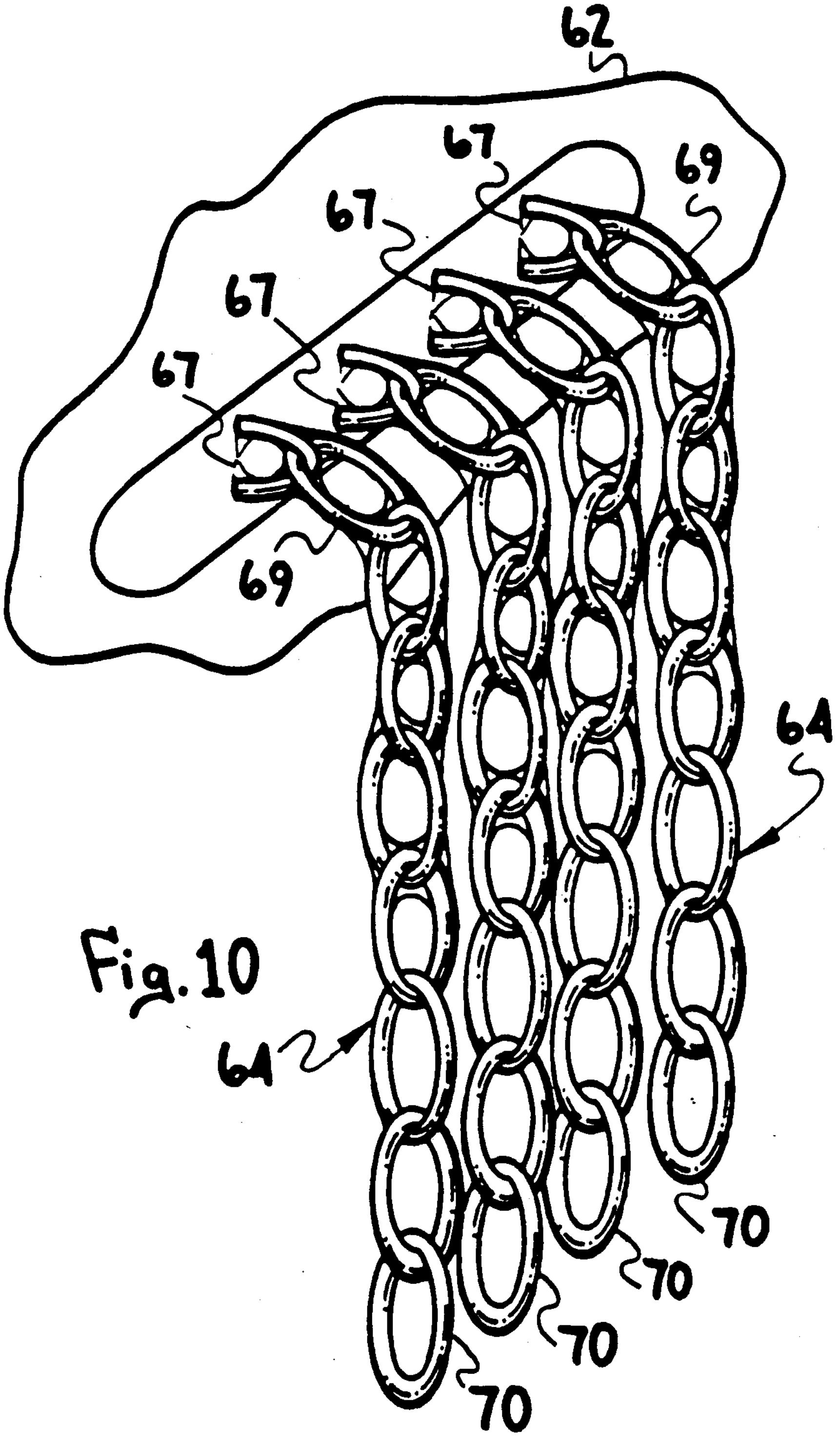
FIG. 10 is an enlarged perspective view of detail B of FIG. 3 in a preferred embodiment structure which shows a bundle of hairs in a line.

FIG. 10 is an enlarged perspective view of detail B of FIG. 3 in a preferred embodiment structure which shows a bundle of hair in a linear row configuration according to the invention is shown in which the body 62 is provided with an elongated hole 67 into which a plurality of strands 64 are bonded using. an adhesive 68. Chain strands 64 are shown as substantially straight hair represented by metal-link chains, and having rigidized first ends 69 with adjacent links soldered together, and second ends 70 which may have adjacent chain links free to move.

Figure 11:
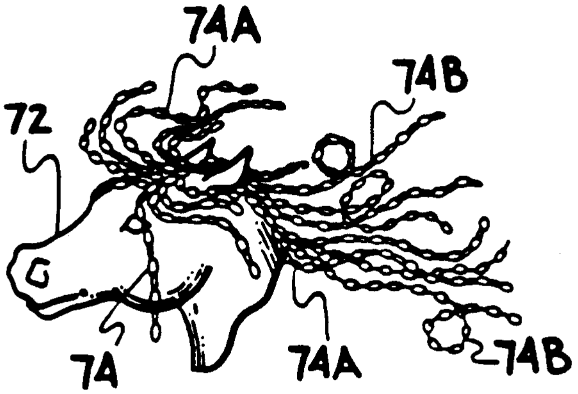
FIG. 11 is a perspective view of a portion of an animal figure according to the invention and having a combination of straight, wavy the curly hair.
Figure 12:
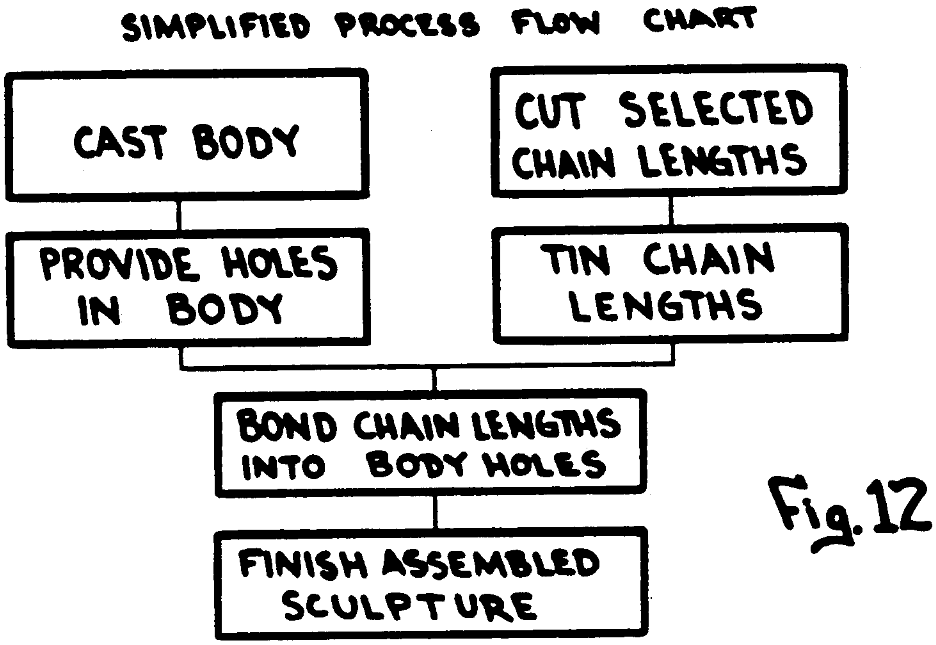
FIG. 12 is a simplified flow process chart describing the method for manufacturing for sculpture according to the invention.

FIG. 11 is a perspective view of an animal body according to the invention and having a combination of straight hair 74 wavy hair 74A and curly hair 74B;

FIG. 12 is a simplified flow process chart describing the method for manufacturing for sculpture according to the invention, wherein an animal body is cast or molded of any rigid material, such as metal, ceramic, stone or organic resin. The animal body is provided with a plurality of small holes in the areas of hair growth. A plurality of strands of fine metallic link chain are cut to an appropriate length to rePresent hair, and at least some of the adjacent chain links are rigidized by tinning with a relatively low melting point metal, such as solder. The first ends of chain link strands are then bonded into the holes provided in the animal body, and the body and chains are finished to the color and texture desired by the artist.

Figure 13:
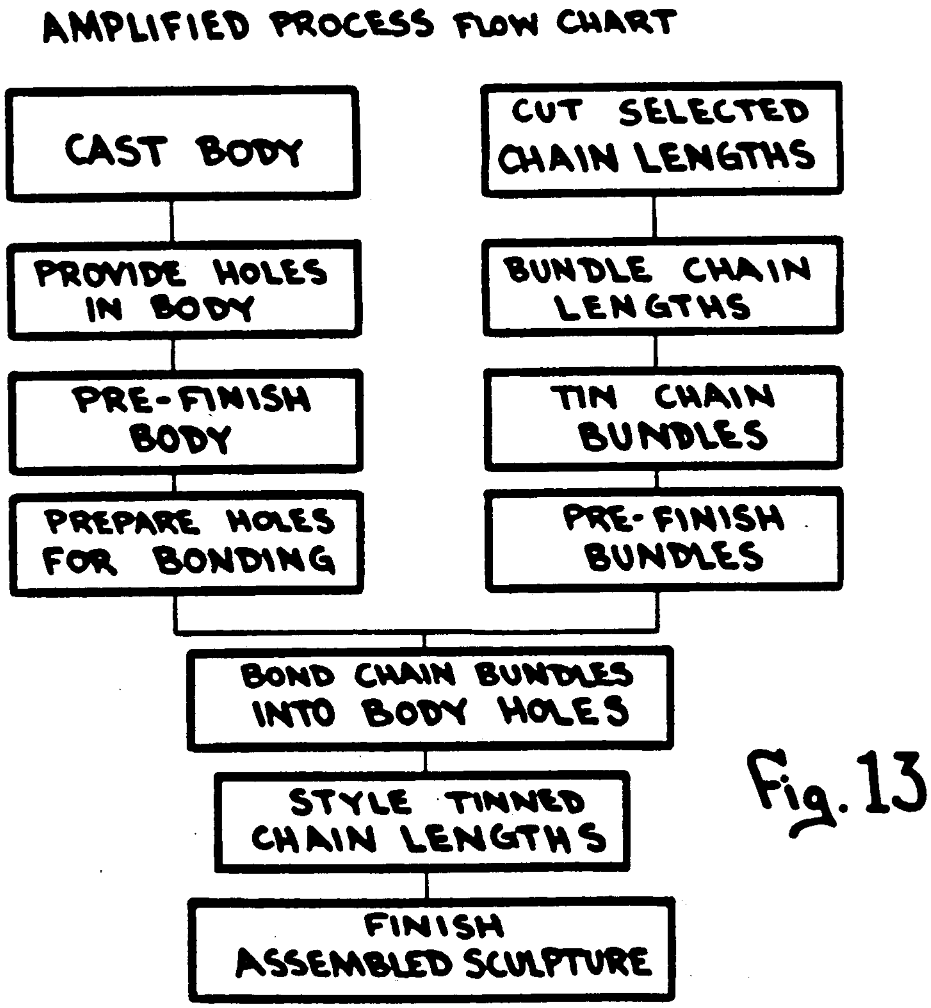
FIG. 13 is an amplified flow process chart describing the method for manufacturing for sculpture according to the invention.

FIG. 13 is an amplified flow process chart describing the method for manufacturing for sculpture according to the invention wherein an animal body is cast or molded of any rigid material, such as metal, ceramic, stone or organic resin. The animal body is provided with a plurality of small holes in the areas of hair growth. The body is pre-finished to the color and texture desired by the artist. Pre-finishing of ceramic materials includes the application of either fired or cold glazes, and pre-finishing of cast metals includes the application of at least one acid to form a patina. The small holes are cleaned by either mechanical or chemical means. A plurality of strands of fine metallic link chain are cut to an appropriate length to represent hair. A number of individual strands are bundled together in groups at their first ends and at least some of the adjacent bundled chain links are rigidized by tinning with a relatively low melting point metal, such as solder. The first ends of chain link strands are then bonded into the holes provided in the animal body, the bonded chains are oriented and styled to simulate normal hair patterns of the figure such as straight hair, waves, curls and braids, and then the sculpture body and hair-simulating chains are finished to the color and texture desired by the artist.

We claim:

1. A method for manufacturing a sculpture having simulated hair including:

casting a rigid body of an animal figure;

providing a plurality of small holes in said animal figure;

selecting cut lengths of metallic link chain; and:

bonding said chains into the holes of the body.

2. A method for manufacturing a sculpture having simulated hair including:

casting a body of an animal figure;

providing a plurality of small holes in said animal body;

selecting cut lengths of metallic chain comprised of interconnected links;

bonding at least some of the chain links together with a metallic solder matrix having a lower melting temperature than the chain link metal;

pre-finishing the chain to a preferred color and reflectance;

bonding the pre-finished chain into the holes of the body;

orienting the bonded chain links to style the chain into a hair pattern; and applying an overall finish to the assembled structure.

3. A method for manufacturing a sculpture having simulated hair according to claim 1 in which the body is cast of material selected from a group including metal casting, ceramic casting and organic resin casting.

4. A method for manufacturing a sculpture having simulated hair according to claim 1 in which the plurality of holes is provided by a process which includes casting the body in a mold having a plurality of pins protruding into a closed cavity.

5. A method for manufacturing a sculpture having simulated hair according to claim 1 in which pre-finishing the cast body includes applying a glaze to a ceramic body.

6. A method for manufacturing a sculpture having simulated hair according to claim 1 in which pre-finishing the cast body includes applying a patina to a metal cast body.

7. A method for manufacturing a sculpture having simulated hair according to claim 1 in which pre-finishing the chain bundles is metallic plating.

8. A method for manufacturing a sculpture having simulated hair according to claim 1 in which pre-finishing the chain bundles is the application of at least one acid and heat to form a patina on the metal chains.

9. A method for manufacturing a sculpture having simulated hair according to claim 1 in which orienting the bonded chain links to style the chain into a hair pattern includes forming chains into hair styles selected from the group of styles including straight hair, waves, curls and braids.

10. A method for manufacturing a sculpture having simulated hair according to claim 1 in which bonding the pre-finished chain bundles into the holes of the body is selected from the group of bonding methods including soldering, brazing, welding and organic adhesive bonding.

11. A method for manufacturing a sculpture having simulated hair according to claim 1 in which the lengths of metallic link chains are selected from the group including oval-link, flat-rolled and diamond-cut chains.

12. A method for manufacturing a sculpture having simulated hair according to claim 2 in which casting the body is selected from a group including metal casting, ceramic casting and organic resin casting.

13. A method for manufacturing a sculpture having simulated hair according to claim 2 in which providing a plurality of holes includes casting the body in a mold having a plurality of pins protruding into a closed cavity.

14. A method for manufacturing a sculpture having simulated hair according to claim 2 in which pre-finishing the cast body includes applying a glaze to a ceramic body.

15. A method for manufacturing a sculpture having simulated hair according to claim 2 in which pre-finishing the cast body includes applying a patina to a metal cast body.

16. A method for manufacturing a sculpture having simulated hair according to claim 2 in which pre-finishing the chain bundles is metallic plating.

17. A method for manufacturing a sculpture having simulated hair according to claim 2 in which pre-finishing the chain bundles is the application of at least one acid and heat to form a patina on the metal chains.

18. A method for manufacturing a sculpture having simulated hair according to claim 2 in which orienting the bonded chain links to style the chain into a hair pattern includes forming chains into hair styles selected from the group of styles including straight hair, waves, curls and braids.

19. A method for manufacturing a sculpture having simulated hair according to claim 2 in which bonding the pre-finished chain bundles into the holes of the body is selected from the group of bonding methods including soldering, brazing, welding and organic adhesive bonding.

20. A method for manufacturing a sculpture having simulated hair according to claim 2 in which the lengths of metallic link chains are selected from the group including oval-link, flat-rolled and diamond-cut chains.

* * * * *